INVENTOR
Robert D Evans.

Patented Oct. 22, 1929

1,732,746

UNITED STATES PATENT OFFICE

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA

AUTOMATIC SYNCHRONIZING OF FREQUENCY CHANGERS

Application filed February 1, 1928. Serial No. 251,114.

This invention pertains to automatic synchronizing devices and more particularly to devices of this type which are designed for controlling the paralleling of the two sides of a frequency-changing motor-generator unit.

The principal object of my invention is to provide a device for automatically paralleling a frequency-changing motor-generator set when both sides thereof are properly synchronized with the two systems to which they are to be connected.

A further object of my invention is to prevent the paralleling of frequency-changing motor-generator sets until the voltages of both frequencies of the lines and the incoming machines are properly synchronized.

In accordance with my invention, I provide each motor-generator set of a frequency-changing station with an auxiliary, two-pole, alternating-current generator. The rotors of these auxiliary generators are similarly alined in all the motor-generator sets in the station, with respect to the rotors of the motor and the generator of each unit, which, of course, must be likewise similarly alined in all units.

By means of suitable relays responsive to the proper quantities, I propose to synchronize the voltages generated by the auxiliary generators. When the voltages of the auxiliary generators are in synchronism, it will be apparent that the voltages of both sides of the units to be paralleled will be in synchronism with the voltages of the lines to which they are to be connected. I provide means for closing a circuit breaker, upon the occurrence of this condition, to connect both sides of the incoming unit to their corresponding lines.

Figure 1:
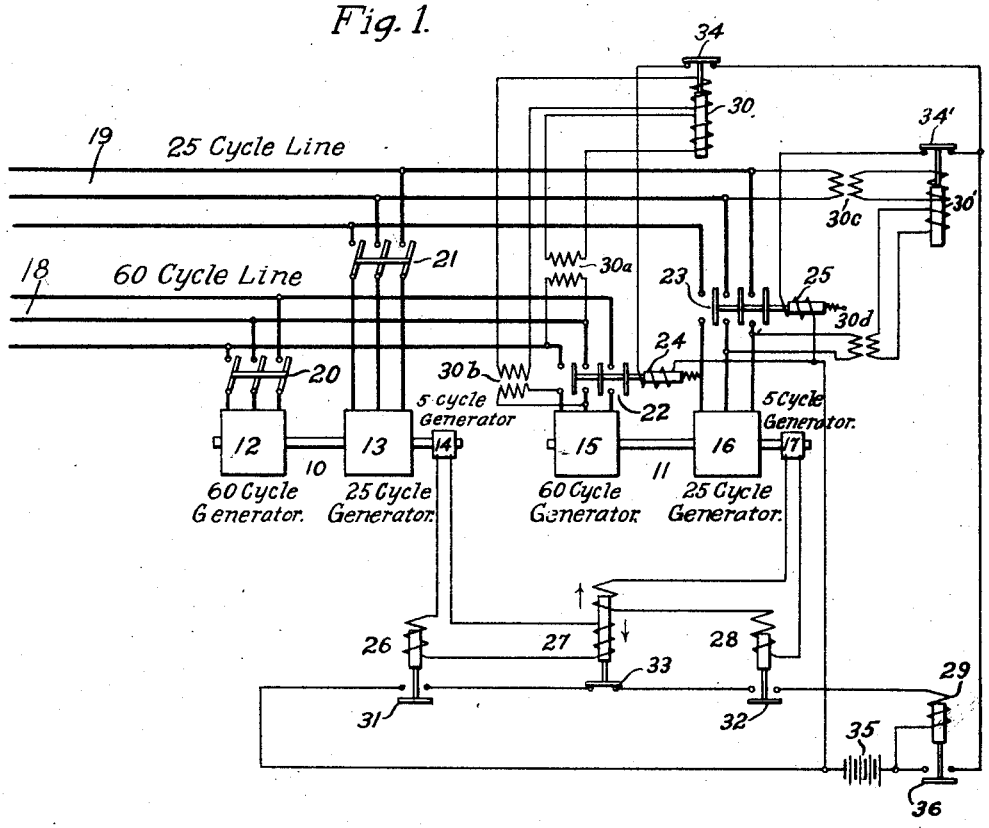
Figure 2:
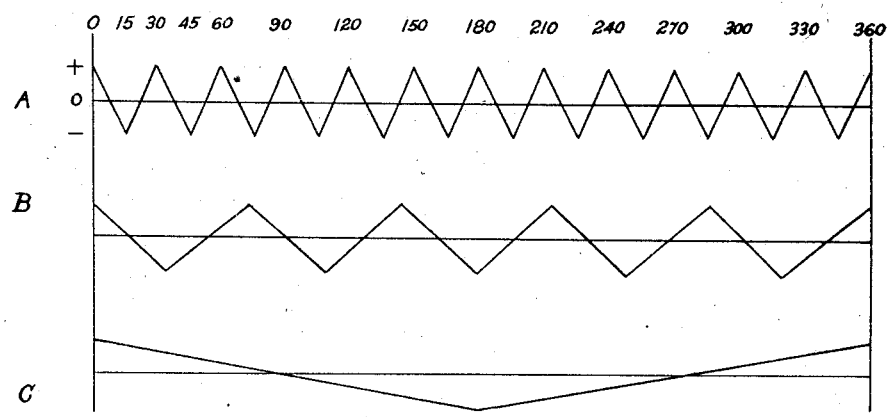

My invention may be more fully understood by reference to the accompanying drawings, in which, Fig. 1 is a diagram illustrating the circuits and apparatus comprising the system of my invention, and Fig. 2 is a schematic representation of the voltage waves generated by the three machines of each unit, straight lines being employed to illustrate the rise and fall of the voltages instead of the usual sine-wave curves.

Referring to Fig. 1, illustrating a frequency-changing station, two motor-generator units are indicated at 10 and 11. Each of these units is made up of three synchronous, alternating-current machines. In the motor-generator set 10, 12 is a 60-cycle machine, 13 a 25-cycle machine and 14 an auxiliary two-pole 5-cycle generator. Similarly, the unit 11 is composed of a 60-cycle machine 15, a 25-cycle machine 16, and a two-pole auxiliary generator 17.

Two alternating-current systems 18 and 19, the system frequencies of which are 60 and 25 cycles, respectively, are adapted to be connected to the machines of corresponding frequency of each unit. Circuit breakers 20 and 21 are employed to control the connections of the machines 12 and 13 to the lines 18 and 19, respectively. These switches are illustrated as of the manually-operated type, but, obviously, any suitable circuit breaker of the automatically-operated type may be substituted therefor.

The connection of the machines 15 and 16 to the alternating-current systems 18 and 19, respectively, is controlled by circuit breakers 22 and 23. These circuit breakers are adapted to be actuated to the closed position by closing coils 24 and 25.

The connections provided for automatically paralleling the incoming motor-generator set with the two systems comprise the auxiliary generators 14 and 17, relays 26 to 29, inclusive, and relays 30 and 30'.

The relays 26 and 28 are simple voltage relays which are adapted to effect engagement of their contacts 31 and 32 when energized by voltage of a predetermined value, and their function is to prevent paralleling in case either of the auxiliary generators should fail to develop its normal voltage.

The relay 27 is provided with two windings which are so connected to the auxiliary generators 14 and 17 that their magnetomotive forces are in opposition. The relay 27 has a contact 33 which is moved to circuit-closing position when both of the coils of the relay are de-energized or when both are energized to the same degree. Unequal energization of the two coils will cause the contact of the relay 27 to be maintained in its open-circuit position.

The relay 30 is similar to the relay 27 except that its two coils are adapted to be energized by the voltage of the system 18 and the voltage of the incoming machine 15 of corresponding frequency. The relay 30, like the relay 27, is adapted to maintain its contact 34 in open-circuit position as long as the two coils are unequally energized and to move it to circuit-closing position when the coils of the relay are both energized to the same degree. The contact 34 controls the circuit to the closing coil 24 of the circuit breaker 22.

A relay 30', similar to the relay 30, has a back contact 34' and two magnetically opposed operating coils which are energized from transformers $30^c$ and $30^d$ connected to the system 19 and the incoming machine 16 of corresponding frequency. The contact 34' controls the circuit of the closing coil 25 of circuit breaker 23.

The relay 29 has its operating coil connected in a circuit including the contacts 31, 32 and 33 of the relays 26, 28 and 27 and a battery 35. The relay 29 has a contact 36 which is closed when the relay winding is energized. This contact controls the circuit including the closing coils 24 and 25 of the circuit breaker 22 and 23.

Having described the circuits and apparatus comprising my invention, I shall now describe the method of operation, in connection with the schematic showing of Fig. 2.

Referring to Fig. 2, curve A illustrates the voltage wave generated by the 60-cycle side of either of the motor-generator sets and curve B illustrates the voltage wave generated by the 25-cycle machine of either unit. Curve C illustrates the voltage wave generated by the two-pole, auxiliary generator of either set.

From an examination of the curves in Fig. 2, it will be apparent that there is only one angular relation between the rotating elements of the frequency-changing units at which the voltage of each machine of the unit will have the same relative value. As illustrated, at the 0° position the voltage of each machine of the unit is at a maximum in the same direction, and there is no other point in the 360° of the curves at which the voltages of the three machines coincide in direction and relative value.

Assuming that one of the motor-generator sets is in operation and connected to the lines, it is possible, by synchronizing the voltages of the two-pole, auxiliary generators, to insure that the voltages of both of the incoming machines will be in synchronism with the machines with which they are to be paralleled.

Let it now be assumed that the motor-generator set 10 is connected to the lines 18 and 19 through the switches 20 and 21 so that the one or the other of the machines 12 and 13 is acting as a motor to drive the other which acts as a generator, whereby energy is taken from one line and supplied, at a different frequency, to the other.

If it should become desirable to place another motor-generator set in service, it is necessary, of course, to synchronize the incoming machines with the lines to which they are to be connected.

If automatic synchronizers known heretofore are employed to perform this function, it may happen that the two sides of the incoming unit will be paralleled with their corresponding lines when only one side of the incoming unit is in synchronism with its corresponding line.

Referring again to Fig. 2, if a synchronizer of the prior art is used to synchronize the 60 cycle side of the incoming unit with its corresponding line, it might easily happen that paralleling would be caused when the 90° voltage wave of the incoming 60-cycle machine reached synchronism with the 0° wave of the line. Under these conditions, the voltage on the 25-cycle side of the incoming machine would be zero while the voltage of the 25 cycle system would have its maximum positive value. If the incoming unit should be connected to the two lines, under these conditions, great damage might result to the machines, since the 25-cycle machines would be 15° out of phase. Equal division of the station load between the units is impossible, of course, under these conditions.

The method of operation embodying my invention precludes the occurrence of any such condition and prevents paralleling of the incoming unit until the voltages of both sides thereof are in synchronism with their corresponding line voltages.

It has been assumed that the unit 10 is connected to the lines 18 and 19 through the switches 20 and 21. When it is desired to place the unit 11 on the line it may be started by any convenient means, well known in the art, and brought up to synchronous speed.

The relay 26 is energized and its contact is moved to circuit-closing position and, as soon as the unit 11 reaches synchronous speed, the relay 28 also closes its switch 32 so that, when both units are running at synchronous speed and only one of them is connected to the line, the contacts 31 and 32 of the relays 26 and 28 will be actuated to circuit-closing position. If the voltage of the 60-cycle line is equivalent to that of the 60-cycle machine of the incoming unit, the coils of the relay 30 will be energized to the same degree and, in accordance with the preceding description, the relay contact 34 will be moved to circuit-closing position. Similarly, when the voltages of the line 19 and the machine 16 are equalized, the relay 30' moves its contact 34' to circuit-closing position.

The synchronizing of the incoming unit is accomplished, in the usual way, by varying its speed in any suitable manner, to adjust the phase relations of the voltages of the incoming machine with that of the line.

As previously explained, when the voltages of the auxiliary generators are synchronized, the voltages of both sides of the incoming motor-generator set are synchronized with the corresponding line voltages. When this condition obtains, the coils of the relay 27 will be energized by currents which are in synchronism, and, since the magnetomotive forces of the windings are opposing, the net effect is to demagnetize the relay armature which is released and the contact 33 is thereupon moved to circuit-closing position.

Thus, the circuit of the operating coil of relay 29, including the battery 35 and the contacts 31, 32 and 33 is closed and the relay 29 is energized to move its contact 36 to circuit-closing position.

The moving of the contact 36 of the relay 29 to circuit-closing position completes a circuit from the battery 35 through contacts 34 and 34' of relays 30 and 30' and the operating coils 24 and 25 of the switches 22 and 23, which are thereupon closed to connect the incoming unit 11 between the lines 18 and 19.

For simplicity, I have shown my automatic synchronizing system applied to control the paralleling switches of only one unit, but it may be extended to each unit in the station. Furthermore, manual means may be provided for closing the circuit breakers 24 and 25 and automatic means for the circuit breakers 20 and 21, so that, if the unit 11 is connected to the systems, the unit 10 may be synchronized by my automatic synchronizer and connected to the lines in the manner described for the unit 11.

It will thus be apparent that, by my invention, I have provided a means for automatically paralleling a frequency-changing motor-generator set with alternating current systems of different frequencies only when both of the incoming machines have been properly synchronized with the corresponding lines. I am thus enabled to obtain equal division of load between a plurality of units in an automatic frequency-changing station which, obviously, could not be obtained by employing synchronizing devices known heretofore, since such devices did not provide for accurately synchronizing both sides of the incoming unit with their respective systems.

Although I have shown but one specific embodiment of my invention, I am aware that modifications thereof will suggest themselves to those skilled in the art and, for that reason, I do not wish to be limited to the modifications disclosed except as indicated in the appended claims.

I claim as my invention:

1. A system for automatically paralleling motor-generator sets comprising auxiliary generators driven by said motor-generator sets, a relay responsive to phase coincidence of the voltages of said auxiliary generators and means controlled by said relay for connecting the motor-generator sets in parallel.

2. In a system for automatically paralleling alternating-current motor generator sets, the combination with said motor-generator sets of means for generating auxiliary voltages having the same relative frequency with respect to the voltages of the motors and generators of each motor-generator set, and means responsive to phase coincidence of the auxiliary voltages for connecting both the motors and generators of said sets in parallel.

3. A system for paralleling two alternating-current motor-generator sets comprising auxiliary generators driven thereby for generating voltages having the same relative frequency with respect to the voltages of the machines of the motor-generator sets and means responsive to phase coincidence of the auxiliary voltages for causing the motors and generators of said sets to be connected in parallel.

4. In a paralleling system, the combination of a plurality of motor-generator sets, each set designed to generate alternating voltages of two different frequencies, of a two-pole alternating-current generator for each motor-generator set, the rotor of each two-pole generator having the same position relative to the rotors of the main units of the sets, whereby both units of said sets may be brought into phase coincidence by adjusting the auxiliary generators for phase coincidence.

5. An automatic frequency-changing station comprising a plurality of alternating-current motors adapted to be driven by a current of one frequency, alternating-current generators driven by the motors for generating a voltage of another frequency, and a plurality of auxiliary two-pole alternating-current generators also driven by said motors, the armature and field windings of each auxiliary generator being similarly alined with the corresponding windings of the main units, and relays responsive to synchronism of the voltages of said auxiliary generators for causing the motors and generators of the different motor-generator sets to be connected in parallel.

In testimony whereof, I have hereunto subscribed my name this 24th day of January, 1928.

ROBERT D. EVANS.